US012565618B2

(12) United States Patent
Zhou et al.

(10) Patent No.: US 12,565,618 B2
(45) Date of Patent: Mar. 3, 2026

(54) DI-ALKYL CHAIN SURFACTANTS AS A MAIN SURFACTANT FOR ENHANCING OIL RECOVERY FOR TIGHT OIL FORMATIONS

(71) Applicants: CNPC USA Corporation, Houston, TX (US); Beijing Huamei, Inc., Beijing (CN); China National Petroleum Corporation, Beijing (CN)

(72) Inventors: Nancy Chun Zhou, Sugar Land, TX (US); Fuchen Liu, Panjin City (CN); Meng Lu, Sugar Land, TX (US); Steven Vaughan, Houston, TX (US)

(73) Assignees: CNPC USA Corporation, Houston, TX (US); Beijing Huamei, Inc., Beijing (CN); China National Petroleum Corporation, Beijing (CN)

( * ) Notice: Subject to any disclaimer, the term of this patent is extended or adjusted under 35 U.S.C. 154(b) by 530 days.

(21) Appl. No.: 18/125,473

(22) Filed: Mar. 23, 2023

(65) Prior Publication Data

US 2023/0295515 A1 Sep. 21, 2023

Related U.S. Application Data

(63) Continuation-in-part of application No. 16/903,777, filed on Jun. 17, 2020, now Pat. No. 11,649,395.

(Continued)

(51) Int. Cl.
| | |
|---|---|
| *C09K 23/42* | (2022.01) |
| *C09K 8/584* | (2006.01) |

(52) U.S. Cl.
CPC .............. *C09K 23/42* (2022.01); *C09K 8/584* (2013.01)

(58) Field of Classification Search
CPC ................................ C09K 23/42; C09K 8/584
See application file for complete search history.

(56) References Cited

U.S. PATENT DOCUMENTS

| | | | |
|---|---|---|---|
| 4,194,565 A | 3/1980 | Kalfoglou | |
| 5,233,087 A * | 8/1993 | Cripe .................... | C07C 51/367 |
| | | | 562/537 |

(Continued)

FOREIGN PATENT DOCUMENTS

| | | |
|---|---|---|
| CA | 2 746 366 | 6/2010 |
| CN | 101921584 | 12/2010 |

(Continued)

OTHER PUBLICATIONS

Yan et al., Performances of Guerbet Alcohol Ethoxylates for Surfactant-Polymer Flooding Free of Alkali, 2017, Energy & Fuels, 31, 9319-9327 (Year: 2017).

(Continued)

*Primary Examiner* — Jiangtian Xu
(74) *Attorney, Agent, or Firm* — Hogan Lovells US LLP

(57) ABSTRACT

Some reservoirs have tight oil formations, such as the Changqing reservoir. The surfactant polymer flooding and low-tension gas flooding are two potential chemical flooding methods for use in tight oil formations. In these methods, an oil displacement agent, or surfactant, is added. Derivatives of nonionic surfactants with extended chains (by propylene oxide and ethylene oxide) from di-alkyl alcohols were developed and tested. A synergistic blend of surfactants was developed between the di-alkyl chain surfactants and a commercially available anionic surfactants that lowers interfacial tension and improves surfactant solubility in high salinity water and oil.

20 Claims, 2 Drawing Sheets

Related U.S. Application Data

(60)  Provisional application No. 62/992,725, filed on Mar. 20, 2020.

(56)  References Cited

U.S. PATENT DOCUMENTS

| | | | |
|---|---|---|---|
| 5,500,138 | A | 3/1996 | Bacon |
| 5,545,350 | A | 8/1996 | Baker |
| 5,705,476 | A | 1/1998 | Hoffarth |
| 6,828,281 | B1 | 12/2004 | Hou |
| 7,842,650 | B2 | 11/2010 | Steinbrenner |
| 8,841,241 | B2 | 9/2014 | Weerasooriya |
| 9,006,166 | B2 | 4/2015 | Zhong |
| 9,296,942 | B2 | 3/2016 | Weerasooriya |
| 10,370,584 | B2 | 8/2019 | Velez |
| 2011/0263467 | A1 | 10/2011 | Bittner |
| 2011/0281779 | A1 | 11/2011 | Weerasooriya |
| 2012/0125643 | A1 | 5/2012 | Langlotz |
| 2020/0248099 | A1 | 8/2020 | Kieffer |
| 2021/0002444 | A1 | 1/2021 | Dwarakanath |
| 2021/0238470 | A1 | 8/2021 | Weerasooriya |

FOREIGN PATENT DOCUMENTS

| | | |
|---|---|---|
| WO | 2014/193720 | 12/2014 |
| WO | 2015/135777 | 9/2015 |

OTHER PUBLICATIONS

International Search Report and Written Opinion mailed Jun. 23, 2023 in corresponding PCT Application No. PCT/US23/17154.

* cited by examiner

DI-ALKYL CHAIN SURFACTANTS AS A MAIN SURFACTANT FOR ENHANCING OIL RECOVERY FOR TIGHT OIL FORMATIONS

CROSS-REFERENCE(S) TO RELATED APPLICATION(S)

This application is a continuation-in-part of U.S. patent application Ser. No. 16/903,777, filed Jun. 17, 2020, titled Nonionic Surfactants Employed with Extended Chain as the Oil Displacement Agent to use in Enhanced Oil Recovery, which claims priority to and the benefit of U.S. Provisional Patent Appln. No. 62/992,725, filed Mar. 20, 2020 titled Nonionic Surfactants Employed with Extended Chain as Surfactant for Enhanced Oil Recovery, the entire disclosures of which are incorporated by reference herein for all intents and purposes.

FIELD

The disclosure relates generally to oil recovery. The disclosure relates specifically to surfactants used in oil recovery.

BACKGROUND

Enhanced oil recovery is the process of increasing the amount of oil that can be recovered from a reservoir. The Changqing reservoirs in China have tight oil formations. Tight oil is oil trapped in rock formations such as shale, limestone, or tight sandstone. These rock formations have lower permeability than other reservoirs. Often, hydraulic fracturing is utilized to create adequate permeability in order to access the oil economically.

It would be advantageous to have an oil displacement agent to use in enhanced oil recovery. Moreover, it would be advantageous to have a surfactant to act as an oil displacement agent to improve oil recovery for the Changqing tight oil reservoir.

SUMMARY

A first embodiment of the present technology provides for a method of making a di-alkyl chain surfactant. A nonionic surfactant can first be produced by reacting a di-alkyl chain primary alcohol with ethylene oxide and propylene oxide. The resultant extended-chain nonionic surfactant can then be reacted with a base, a chloride acid or a salt derivative of a chloride acid, and a glycol ether. Water can be added to the resulting product to produce the di-alkyl surfactant.

In some embodiments, the di-alkyl primary alcohol can be made via aldol condensation reaction or Guerbet reaction. The extended-chain nonionic surfactant can have a formulation of $C_mH_{2m+1}CH(C_nH_{2n+1})CH_2O(PO)_x(EO)_yH$. In the formulation, m can be 4, 6, 8, 10, 12, 14, 16, 18, 20, 22, or any combination thereof, n can be 2, 4, 6, 8, 10, 12, 14, 16, 18, 20, or any combination thereof, m+n can be 6, 8, 10, 12, 14, 16, 18, 20, 22, 24, 26, 28, 30, 32, 34, 36, 38, 40, 42, or any combination thereof, x can be between 0 and 50; and y can be between 0 and 30.

The method can further include nitrogen purging during the reaction steps. In some embodiments, a condensation trap or condensation receiver can be used to collect water or organics for reuse.

In some embodiments, the nonionic surfactant can be heated to a temperature of less than 50 degrees Celsius prior to the reaction with the base.

The base can be any metal hydroxide or metal alkoxide, such as potassium hydroxide, sodium hydroxide, sodium methoxide, sodium ethoxide, potassium methoxide, lithium hydroxide, or potassium tert-butoxide. The base can be added at a ratio of 1-2 moles for every 1 mole of nonionic surfactant. The base can be reacted at about 90-120 degrees Celsius for about 0.5 to 3 hours with the nonionic surfactant.

The chloride acid can be a monochloroacetic acid, or its salt derivative such as sodium monochloroacetate (SMCA). Alternatively, the chloride acid can be a 3-chloro-2-hydroxy-1-propanesulfonic acid (CHPS) or its salt derivatives such as 3-chloro-2-hydroxy-1-propanesulfonic acid sodium salt. The chloride acid can also be chlorosulfonic acid. The chloride acid or its salt derivative can be added at a ratio of 1-1.9 moles for every 1 mole of the nonionic surfactant. The chloride acid can be reacted at below 100 degrees Celsius and above 70 degrees Celsius for about 2-5 hours. The chloride acid can further be reacted until the free chloride ion within the reaction is in the range of about 1.2-2.7%.

In some embodiments, the glycol ether can be a tetrapropylene glycol monomethyl ether, a tripropylene glycol monomethyl ether, a tripropylene glycol monoethyl ether, a tripropylene glycol dimethyl ether, a tripropylene glycol diethyl ether, a dipropylene glycol dimethyl ether, a dipropylene glycol diethyl ether, a dipropylene glycol monomethyl ether, or a diethylene glycol monobutyl ether. The glycol ether can be added at a 0.5 to 2 mass ratio with the nonionic surfactant. The glycol ether can be reacted for about 1-3 hours at about 50 to 90 degrees Celsius with the preceding portions of the reaction. Water can be added at a 0.5 to 2 mass ratio with the nonionic surfactant to produce the final product of the di-alkyl surfactants.

In some embodiments, the di-alkyl surfactant can form Type III microemulsions with aqueous phase and oil phase. These microemulsions can have interfacial tensions of less than $10^{-3}$ mN/m. In some embodiments, the type III microemulsions can be formed in aqueous fluid with 30,000 to 120,000 ppm of total dissolved solids. In some embodiments, the di-alkyl surfactant produced by the reaction can be a clear, viscous liquid.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
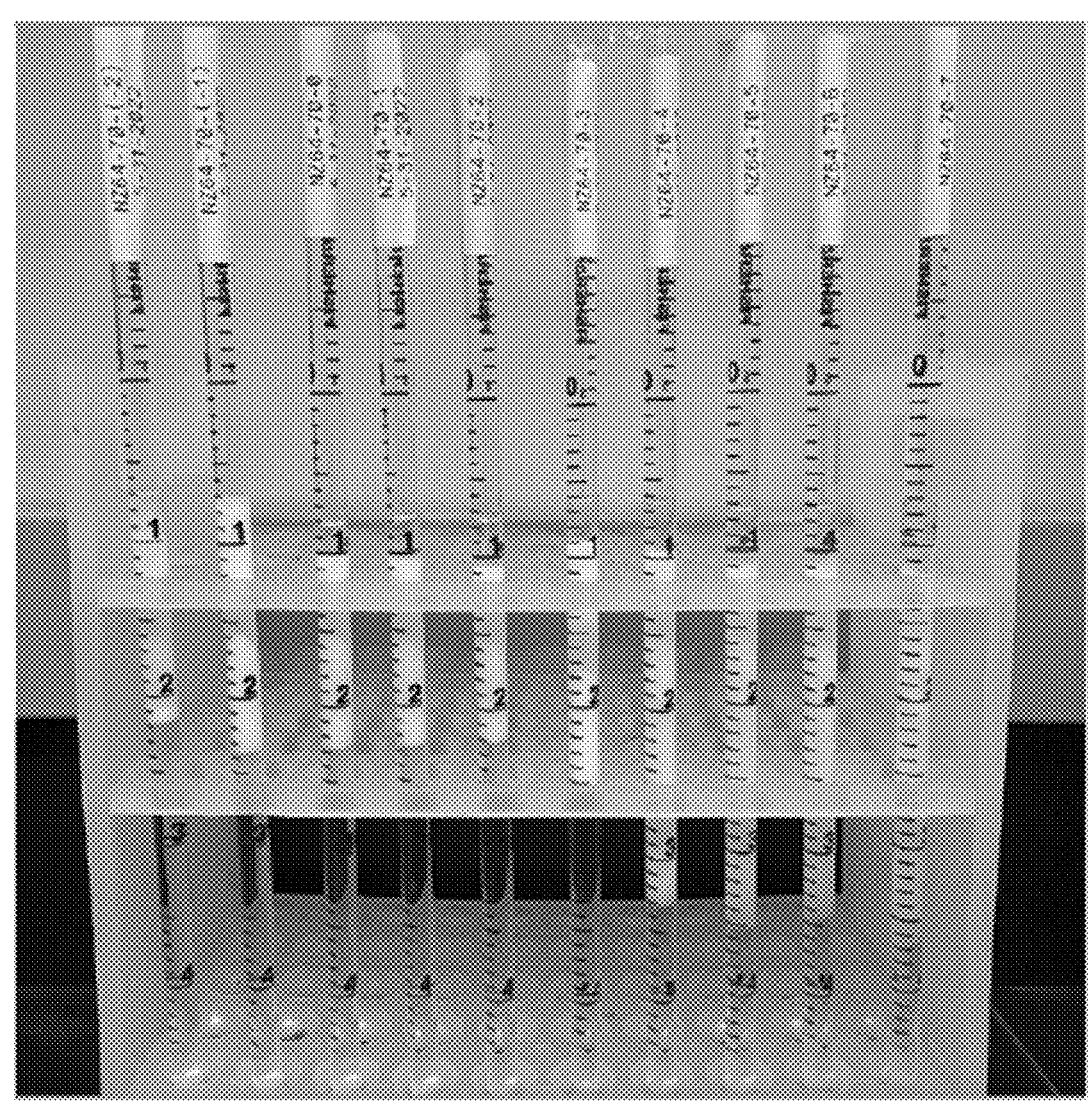
FIG. 1 is a salinity scan for microemulsion phase behavior tests at 200 degrees Fahrenheit using dodecane as the oil phase, taken on day four.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

Surfactant-polymer (SP) flooding and low-tension gas (LTG) flooding are proposed as two chemical flooding methods for enhanced oil recovery for the Changqing tight oil formation reservoir. In both methods, the key additive is the oil displacement agent or surfactant. Initially, a series alkyl propoxy sulfates (APS) (primary surfactant) with alkyl benzyl sulfonates (ABS) (co-surfactant) were tested. Following those tests, di-alkyl chain surfactants as the main surfactant will be used to run chemical flooding tests to demonstrate the efficiency of the enhance oil recovery.

Synergistic blends of surfactants using di-alkyl surfactants as the main component with the help of co-surfactant of ABS were developed those lower interfacial tension (IFT) and improve surfactant solubility in high salinity water and oil.

A first embodiment of the present technology provides for a method of manufacturing an oil displacement agent. The oil displacement agent can be used to improve oil recovery in tight oil reservoirs. The tight oil reservoirs can have a high salinity and a high temperature.

The oil displacement agent can be manufactured from a reaction of a di-alkyl primary alcohol. The di-alkyl primary alcohol can be, but is not limited to, any Guerbet alcohol. The di-alkyl primary alcohol can further be reacted with EO and PO to form the initial nonionic surfactant. In some embodiments, there can be between 0-30 EO and between 0-50 PO as a part of the nonionic surfactant.

The resulting nonionic surfactant can have a formula of $C_mH_{2m+1}CH(C_nH_{2n+1})CH_2O(PO)_x(EO)_yH$. In the formulation, m can be 4, 6, 8, 10, 12, 14, 16, 18, 20, 22 or any combination thereof, n can be 2, 4, 6, 8, 10, 12, 14, 16, 18, 20, or any combination thereof, m+n can be 6, 8, 10, 12, 14, 16, 18, 20, 22, 24, 26, 28, 30, 32, 34, 36, 38, 40, 42, or any combination thereof, x can be between 0-50; and y can be between 0-30. The nonionic surfactant can then be heated to a temperature of less than 50 degrees Celsius. During this time the nonionic surfactant can also be nitrogen purged.

At this time, a base can be added to the nonionic surfactant. The base used can include, but is not limited to, potassium hydroxide (KOH), sodium hydroxide (NaOH), sodium methoxide (MeONa), sodium ethoxide (EtONa), potassium methoxide (MeOK), lithium hydroxide (LiOH), potassium tert-butoxide (t-Bu-OK), and other metal hydroxide or metal alkoxide bases. When using KOH, the KOH can be added at a ratio of 1-2 moles for every 1 mole of the nonionic surfactant. During this reaction, the temperature can be maintained at between 90 and 120 degrees for about 0.5 to 3 hours. The nitrogen purge and/or vacuum can be maintained during this time. A condensation trap or receiver can be used to collect all water formed, maximized at a 1 to 1 mole ratio of nonionic surfactant.

After the reaction is complete, the resulting product can be cooled to about 75-95 degrees Celsius for the addition of a chloride acid or its derivative. At this time, a sodium monochloroacetate (SMCA) can be added to the system. The SMCA can be added at a ratio of 1-1.9 moles for every 1 mole of the nonionic surfactant. The reaction can be maintained at a temperature below 100 degrees Celsius for about 2-5 hours. The reaction can be allowed to continue until the free chloride ion of the composition is in the range of 1.2-2.7%. The nitrogen purge can be maintained during this time.

Alternatively, monochloroacetic acid, chlorosulfonic acid, 3-chloro-2-hydroxy-1-propanesulfonic acid or their sodium salts, such as 3-chloro-2-hydroxy-1-propanesulfonic acid sodium salt (CHPS) can be added instead of SMCA. When using CHPS, the reaction can proceed similar to SMCA.

Following this reaction, tetrapropylene glycol monomethyl ether, tripropylene glycol monomethyl ether (TPM), a tripropylene glycol monoethyl ether, a tripropylene glycol dimethyl ether, a tripropylene glycol diethyl ether, a dipropylene glycol dimethyl ether, a dipropylene glycol diethyl ether, a dipropylene glycol monomethyl ether, or a diethylene glycol monobutyl ether can be added to the reaction. The TPM can be added to the system at a 0.5 to 2 mass ratio with the nonionic surfactant. The reaction can be continued for about 1-3 hours. This can continue until all of the organic chlorides from the SMCA or the CHPS are free chloride ions. The nitrogen purge can be maintained during this time. A condensation trap or receiver can be used to collect all evaporated organic chemicals for recycle or reusage.

Finally, water can be added to the formulation to arrive at the final surfactant. The water can be added at a 0.5 to 2 mass ratio with the nonionic surfactant. The resulting surfactant can be a clear, viscous liquid.

FIG. 1 is a salinity scan for microemulsion phase behavior tests at 200 degrees Fahrenheit using dodecane as the oil phase. Phase behavior tests can be used to show the formation of Type III microemulsions. A microemulsion is a thermodynamically stable fluid. Microemulsions can be classified as Winsor Type I, Type II or Type III. Type III microemulsion is a three-phase mixture with an excess brine phase, an excess oil phase, and a microemulsion phase. Typically, a lower interfacial tension of surfactants means a higher volume of the microemulsion phase. These Type III microemulsions in FIG. 1 have low interfacial tensions of less than $10^{-3}$ mN/m. In addition, the Type III microemulsions can be formed in salinity ranges of between about 30,000 ppm to about 120,000 ppm of total dissolved solids, which outperforms a lot of commercially available surfactant formula.

Figure 2:
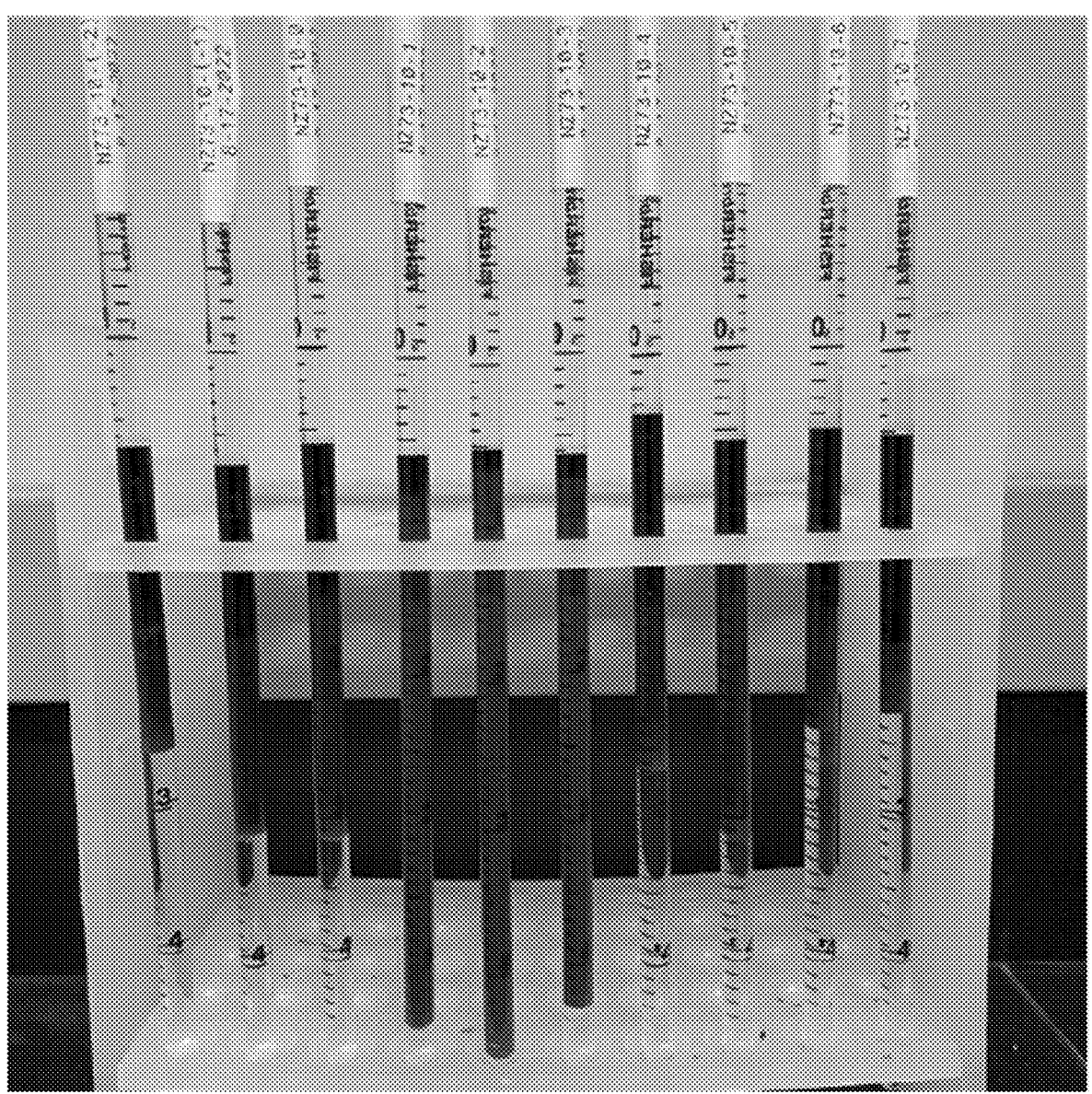
FIG. 2 is a salinity scan for microemulsion phase behavior tests at 200 degrees Fahrenheit using crude oil as the oil phase, taken on day eight.

FIG. 2 is a salinity scan for microemulsion phase behavior tests at 200 degrees Fahrenheit using crude oil as the oil phase. The crude oil is from an oil field of interest. Comparing with FIG. 1, we know that this surfactant formula performs well for the field crude oil.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope, and concept of the disclosure as defined by the appended claims.

What is claimed is:

1. A method of making a di-alkyl surfactant comprising:

reacting a di-alkyl primary alcohol with ethylene oxide and propylene oxide to form a nonionic surfactant;

reacting the nonionic surfactant with a base to form a first composition;

reacting the first composition with a chloride acid or a salt derivative of a chloride acid to form a second composition;

reacting the second composition with a glycol ether to form a third composition; and adding water to the third composition to produce the di-alkyl surfactant.

2. The method of claim 1 wherein the nonionic surfactant has a formulation of $C_mH_{2m+1}CH(C_nH_{2n+1})CH_2O(PO)_x(EO)_yH$ wherein:

m can be 4, 6, 8, 10, 12, 14, 16, 18, 20, 22, or any combination thereof;

n can be 2, 4, 6, 8, 10, 12, 14, 16, 18, 20, or any combination thereof;

x can be from 0-50; and y can be from 0-30.

3. The method of claim 1 further comprising:

purging the nonionic surfactant with at least one of nitrogen or a vacuum during the reacting steps.

4. The method of claim 1 further comprising:

using a condensation trap or a condensation receiver to collect water or organics for reuse.

5. The method of claim 1 further comprising:

heating the nonionic surfactant to a temperature of less than about 50 degrees Celsius prior to reacting the nonionic surfactant with the base.

6. The method of claim 1 wherein the base is one or more of potassium hydroxide, sodium hydroxide, sodium methoxide, sodium ethoxide, potassium methoxide, lithium hydroxide, or potassium tert-butoxide.

7. The method of claim 1 wherein the base is added at a ratio of 1 to 2 moles for every 1 mole of the nonionic surfactant.

8. The method of claim 1 wherein the reaction with the base occurs at between about 90 degrees Celsius to about 120 degrees Celsius.

9. The method of claim 1 wherein the salt derivative of a chloride acid is one or more of sodium monochloroacetate or 3-chloro-2-hydroxy-1-propanesulfonic acid sodium salt.

10. The method of claim 1 wherein the chloride acid is one or more of monochloroacetic acid, chlorosulfonic acid, or 3-chloro-2-hydroxy-1-propanesulfonic acid.

11. The method of claim 1 wherein the chloride acid or the salt derivative of a chloride acid is added at a ratio of 1-1.9 moles for every 1 mole of the nonionic surfactant.

12. The method of claim 1 wherein the reaction with the chloride acid or the salt derivative of a chloride acid occurs at about 70-100 degrees Celsius.

13. The method of claim 1 further comprising:

reacting the chloride acid or the salt derivative of a chloride acid until the free chloride ion of the reaction is in the range of about 1.2-2.7%.

14. The method of claim 1 wherein the glycol ether is one or more of tetrapropylene glycol monomethyl ether, tripropylene glycol monomethyl ether, tripropylene glycol monoethyl ether, tripropylene glycol dimethyl ether, tripropylene glycol diethyl ether, dipropylene glycol dimethyl ether, dipropylene glycol diethyl ether, dipropylene glycol monomethyl ether, or diethylene glycol monobutyl ether.

15. The method of claim 1 wherein the glycol ether is added at a 0.5 to 2 mass ratio to the nonionic surfactant.

16. The method of claim 1 wherein the glycol ether is reacted at about 50-90 degrees Celsius.

17. The method of claim 1 wherein the water is added at a 0.5 to 2 mass ratio to the nonionic surfactant.

18. The method of claim 1 wherein the di-alkyl surfactant forms a Type III microemulsion with interfacial tensions of less than $10^{-3}$ mN/m.

19. The method of claim 18 wherein the Type III microemulsion is formed in fluids with 30,000 to 120,000 ppm of total dissolved solids.

20. The method of claim 1 wherein the di-alkyl surfactant is a clear, viscous liquid.

\* \* \* \* \*